United States Patent [19]

Conover

[11] 4,387,902

[45] Jun. 14, 1983

[54] ELASTOMERIC SEAL RING WITH SELF-LUBRICATING WEAR-REDUCING FEATURE

[75] Inventor: Charles E. Conover, Mountain Lakes, N.J.

[73] Assignee: C. E. Conover & Co., Inc., Fairfield, N.J.

[21] Appl. No.: 312,775

[22] Filed: Oct. 19, 1981

[51] Int. Cl.³ .............................................. F16J 15/32
[52] U.S. Cl. .................................. 277/203; 277/134;
    277/165; 277/207 R
[58] Field of Search ............... 277/152, 153, 165, 203,
    277/207 R, 134, 138

[56] References Cited

U.S. PATENT DOCUMENTS 3,149,848  9/1964  Galloway ........................... 277/165
3,195,902  7/1965  Tisch ......................... 277/207 R X

FOREIGN PATENT DOCUMENTS 2348739  6/1974  Fed. Rep. of Germany ...... 277/134
 756460  9/1956  United Kingdom ............... 277/165
1025704  4/1966  United Kingdom ........... 277/207 R
1196451  6/1970  United Kingdom ............... 277/134

Primary Examiner—Robert S. Ward, Jr.
Attorney, Agent, or Firm—Hopgood, Calimafde, Kalil, Blaustein & Judlowe

[57] ABSTRACT

An annular elastomeric seal-ring construction having a body adapted for stabilized retention in a circumferential seal-ring groove in one of two relatively rotatable members and for circumferentially continuous resilient contact with an opposed wiping surface of the other member. The resilient wiping contact is established via an integral rib of width less than body width, wherein the locus of the rib undulates axially as a function of azimuth about the axis of the ring body.

11 Claims, 9 Drawing Figures

ELASTOMERIC SEAL RING WITH SELF-LUBRICATING WEAR-REDUCING FEATURE

BACKGROUND OF THE INVENTION

The invention relates to an annular elastomeric seal-ring construction of the variety suited to establish a sealed interface between two relatively rotatable members, such as a shaft and the bore of a supporting body in which the shaft is journaled.

Of the various elastomeric seal constructions devised to establish a circumferentially continuous sealed running interface between two relatively rotatable members, the O-ring is most currently favored. It has a circular cross-section and is generally retained in a circumferential groove of rectangular section in one of the rotatively rotatable members; the circular section is stabilized in its retention between spaced parallel walls of the groove section, and the circular section is in circumferentially continuous resiliently stressed contact with the bottom of the groove, while also in resiliently stressed wiping contact with an opposed circumferentially continuous surface of the other member. For a shaft and its supporting journal, such a seal necessarily establishes but a line of sealing contact, wherein said line is in a single radial plane of the axis of relative rotation, thus limiting lubrication of the line of wiping contact. Further, such a seal tends to rotate locally about its section, becoming torsionally twisted and stressed in the course of axial assembly of a shaft to its journal.

The so-called quad-ring section has been devised for elastomeric seal rings, in an effort to stabilize the same against torsional twist, either in the course of assembly or otherwise. Such a ring establishes two axially spaced lines of circumferentially continuous contact at the wiping interface. However, each of these lines is in its own single radial plane of the rotational axis, thus limiting lubrication of both lines of wiping contact.

So-called lip seals are known in which a circumferentially continuous elastomeric lip is molded or otherwise bonded to the circumferential flange of a steel sleeve adapted for force-fit or other retention in a counterbore of the shaft-supporting member. The lip section provides resiliently cantilevered axial offset for the locus of seal contact with the shaft, in reference to the location of flange support, and the seal-contact region of the lip is characterized by a radial projection which axially undulates to sweep an axial range of shaft contact for each cycle of rotation. A circumferential spring is carried by the lip, behind its region of shaft contact, in order to establish desired resilient loading of the locus of shaft contact.

BRIEF STATEMENT OF THE INVENTION

It is an object of the invention to provide an improved single-piece rotary seal of the character indicated, avoiding limitations of prior single-piece constructions.

Another object is to provide a single-piece construction achieving self-lubricating sealing contact between relatively rotatable members, to a degree that is as good or better than for seals of multiple-part constructions.

A specific object is to achieve the above object with an axially undulating configuration, at the locus of seal contact with a rotating surface.

Another specific object is to achieve the foregoing objects in a construcion inherently installable in place of a prior O-ring seal or in place of a prior quad-ring seal, without modification of the circumferential groove which retained the prior seal ring.

A still further specific object is to provide a single-piece ring construction of the character indicated wherein resiliently loaded seal contact in an axially undulating seal is derived solely from the seated body of the ring and is axially uniformly distributed between axial limits of the ring.

The invention achieves these objects and further features in a single-piece elastomeric annular ring of rectangular body section, wherein uniformly spaced sidewalls of the body section are adapted for stabilizing contact with similarly spaced walls of a retaining groove, such as an O-ring groove in one of two relatively rotatable members, and wherein the body-section thickness substantially matches groove depth, there being an integrally formed circumferentially continuous rib projecting for resiliently loaded wiping contact with an opposed smooth circumferentially continuous surface of the other relatively rotatable member. The rib is narrow compared to ring-body width, and the locus of the rib undulates between sidewalls of the body, the undulation being as a function of azimuth about the body axis.

DETAILED DESCRIPTION OF THE INVENTION

The invention will be illustratively described in detail in conjunction with the accompanying drawings, in which:

FIG. 1 is a perspective view of a seal ring of my invention;

FIGS. 2, 3, 4 and 5 are like fragmentary sectional views, respectively taken at angularly spaced locations 2—2, 3—3, 4—4 and 5—5 of FIG. 1;

Figure 6:
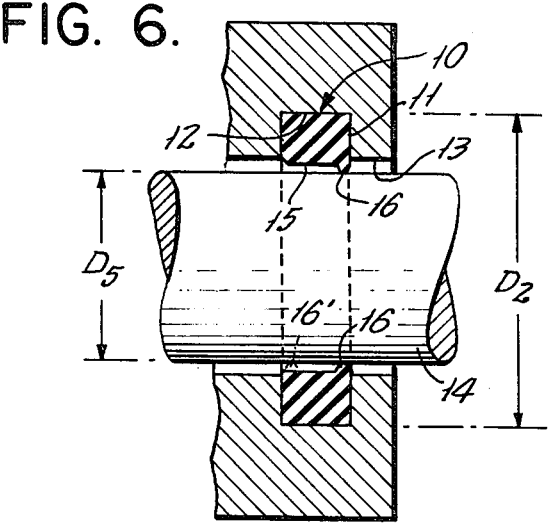
FIG. 6 is a vertical sectional view to illustrate a seal ring of FIG. 1 in installed relation to two relatively rotatable parts, wherein seal action between moving surfaces is radially within the seal ring.

Referring initially to FIGS. 1 to 6, the invention is shown in application to a single-piece annular seal ring 10 of suitable elastomeric material, such as Neoprene. Ring 10 comprises a circumferentially continuous body 11 of uniform rectangular section having axially spaced sidewalls sized for substantially complete axially stabilized support by and between the spaced sidewalls of a retaining groove 12 (FIG. 6) in a frame or the like member 13, with respect to which (and within a bore 13' of which) another member such as a shaft 14 is relatively rotatable. The radial thickness of body 11 substantially matches the depth of groove 12, and the outer diameter $D_1$ of the ring body 11 is preferably selected for such slight interference with the groove-bottom diameter $D_2$ as to assure circumferentially uniform resiliently stressed extensive sidewall and groove-bottom support of ring body 11. Illustratively, the groove 12 may be a conventional O-ring groove, and seal ring 10 may be a replacement for a previous O-ring in groove 12. As shown in FIG. 6, the stressed mounted condition of ring 10, places the bore surface 15 thereof at slight radial offset within the bore 13' of member 13.

Figure 1:
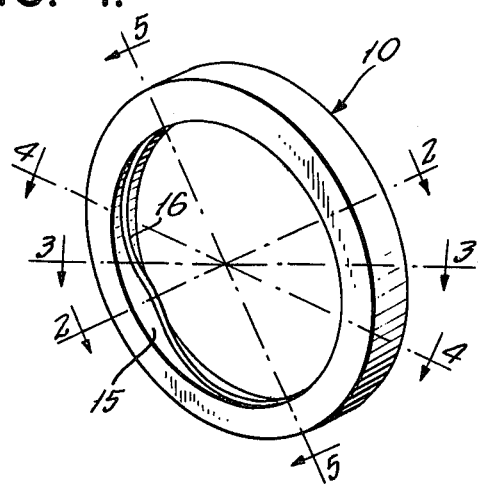
Figure 2:
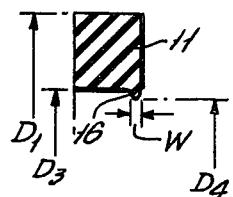
Figure 3:
Figure 4:
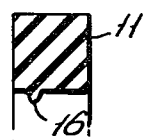
Figure 5:
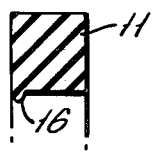

In accordance with the invention, a circumferentially continuous integrally formed seal rib 16 of axially undulating configuration projects radially inward of the bore surface 15. The undulation may be sinusoidal as a function of azimuth about the rotational axis, a preference being shown for one full cycle of undulation for $\pi$ radians of azimuth, i.e., two undulation cycles per rotation; and the axial width W of rib 16 is but a small fraction, e.g., 15 to 25 percent, of the axial extent of surface 15, while the unstressed radial extent of rib 16 is preferably in the order of magnitude of width W. In FIG. 2, this unstressed radial extent is the difference between the bore (15) diameter $D_3$ and the diameter $D_4$ of a geometrical cylinder to which the inner, preferably arcuately crowned, limit of rib 16 is tangent. Preferably, the unstressed rib diameter $D_4$ substantially matches the shaft diameter $D_5$, so that upon stressed installation of ring 10 in groove 12, a resulting inward displacement of rib 16 accounts for circumferentially continuous resiliently loaded rib 16 contact with shaft 14.

Figure 7:
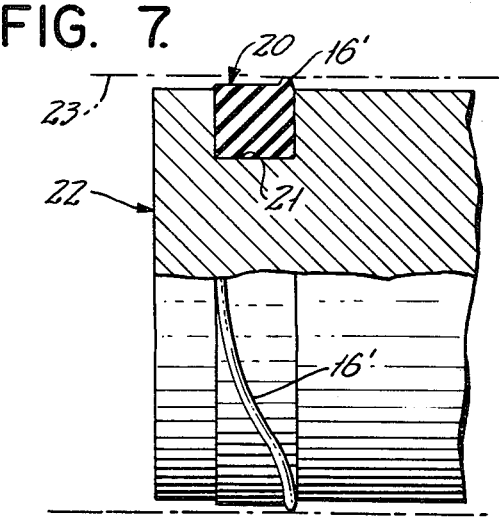
FIG. 7 is a view similar to FIG. 6 to illustrate a modified seal ring installed for seal action between moving surfaces radially outside the seal ring.

In the modification of FIG. 7, an elastomeric seal ring 20 of construction similar to ring 10, but with its axially undulating rib 16' projecting radially outwardly, is mounted to a groove 21 in the inner one (22) of two relatively rotatable members, the rib 16' having circumferentially continuous resiliently loaded wiping contact with a bore 23 in the other of said members.

Figure 8:
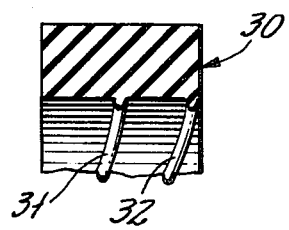
FIGS. 8 and 9 are like fragmentary vertical sectional views of further-modified seal constructions, respectively adapted for the radially inner and for the radially outer seal-action environments exemplified by FIGS. 6 and 7.

In the modification of FIG. 8, an elastomeric seal ring 30 of construction similar to that of ring 10 is axially more extensive so that two spaced axially undulating ribs 31-32 may have wiping-inner contact within a more axially extensive span, and providing a double-seal action. Preferably, the axial undulations of ribs 31-32 are cophasal and of equal magnitude.

Figure 9:
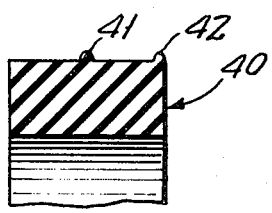

In the modification of FIG. 9, an elastomeric seal ring of construction similar to that of ring 20 is axially more extensive so that two spaced axially undulating ribs 41-42 may have wiping outer contact within a more axially extensive span, and providing a double-seal action. As in FIG. 8, the axial undulations of ribs 41-42 in FIG. 9 are preferably cophasal and of equal magnitude.

The described invention will be seen to achieve all stated objects. In use, the region of rib contact with the shaft is regularly swept, and is self-lubricating in the event of sealing against egress of a liquid or other lubricant. Wear is very substantially reduced, as compared with the indicated types of seals which the inventive seal is particularly adapted to replace. And there is absolutely no tendency of the seal to develop the torsional twist which characterizes prior constructions.

While the invention has been described in detail for preferred embodiments, it will be understood that modifications may be made without departing from the scope of the invention.

What is claimed is:

1. An elastomeric seal ring adapted for stressed retention in a conventional O-ring circumferential groove in one of two relatively rotatable members and for establishing a sealed interface to a circumferentially continuous wiping-contact area of the other rotatable member in the course of relative rotation, said ring comprising an integral annular body containing elastomeric material as an essential ingredient and configured for substantially complete conformance with the walls of the groove, said body having a uniform rectangular radial-section profile throughout the region thereof which is adapted for retained reception in the groove of the one member thus exposing a body surface of substantially groove width for circumferentially continuous confronting relation to the wiping-contact area of the other member, said body surface being characterized by a rib of width substantially less than the groove width, said rib continuously undulating as a function of azimuth about the body axis and between limits established by the overall width of the groove, and said rib projecting radially from the exposed body surface as the sole feature of said ring in contact with the wiping-contact area of the other rotatable member.

2. The seal ring of claim 1, in which the extent to which said rib projects away from the exposed body surface is approximately the same as the width of said rib.

3. The seal ring of claim 1, in which the width of said rib is at least no greater than 25 percent of the width of said exposed body surface.

4. The seal ring of claim 1, in which the width of said rib is approximately 20 percent of the width of said exposed body surface.

5. The seal ring of claim 1, in which the radial-section profile of said body is rectangular with the exposed body surface defined by one of the rectangular section sides.

6. The seal ring of claim 5, in which the body-section profile is oriented to provide cylindrical inner and outer surfaces, said rib undulating axially in its radially inward projection from the inner surface.

7. The seal ring of claim 5, in which the body-section profile is oriented to provide cylindrical inner and outer surfaces, said rib undulating axially in its radially outward projection from the outer surface.

8. The seal ring of claim 6 or claim 7, in which said rib is one of two axially spaced ribs projecting from the same body surface.

9. The seal ring of claim 8, in which said two ribs are characterized by in-phase undulation as a function of aximuth about the body axis.

10. The combination of the seal of claim 1 and inner and outer relatively rotatable members, wherein the ring-body width substantially matches the groove width and the ring-body thickness exceeds the groove depth substantially to the projecting extent of said rib.

11. In combination, relatively rotatable elements comprising a machine element having a shaft bore and a shaft element in said bore, said bore having a radially inwardly open conventional O-ring circumferential groove and said shaft element having a cylindrical seal-wiping surface in axial lap of said groove and in local radial clearance with said bore, and an elastomeric seal ring retained in said groove and establishing a circumferentially continuous sealed interface to said seal-wiping surface in the course of relative rotation; said ring comprising an integral annular body containing elastomeric material as an essential ingredient and configurated for substantially complete conformance with the walls of said groove, said body having a uniform rectangular section profile throughout the region thereof which is adapted for retention by and between the walls of said groove, the unstressed outer diameter of said ring slightly exceeding the groove-bottom diameter for compressionally stressed interference fit to the groove bottom to thereby also establish stressed engagement of said body with the side walls of the groove, whereby the bore of said ring body is radially inwardly stressed and exposed for substantially the width of said groove in circumferentially continuous confronting relation to the seal-wiping surface of said shaft element, said bore being characterized by a radially inward rib wholly within said clearance and of width substantially less than the groove width, said rib continuously undulating as a function of azimuth about the body axis and between limits established by the overall width of the groove, said rib in unstressed condition having an inner diameter substantially equal to that of said seal-wiping surface, whereby ring-body stress when retained in said groove establishes resilient loading of said rib to said seal-wiping surface.

* * * * *